United States Patent
Rolla

(10) Patent No.: US 6,637,486 B1
(45) Date of Patent: Oct. 28, 2003

(54) RIM WITH EMERGENCY GROOVED INTERNAL SUPPORT AND TIRE FOR SAID RIM

(76) Inventor: José Santiago Rolla, Humberto 1° 1059, Luján, Provincia de Buenos Aires (AR), 6700

( * ) Notice: Subject to any disclaimer, the term of this patent is extended or adjusted under 35 U.S.C. 154(b) by 0 days.

(21) Appl. No.: 10/260,911

(22) Filed: Sep. 30, 2002

(30) Foreign Application Priority Data

May 6, 2002 (AR) .................................. P 02 01 01650

(51) Int. Cl.[7] .............................................. B60C 17/04
(52) U.S. Cl. ..................... 152/381.6; 152/520
(58) Field of Search ...................... 152/381.3, 381.4, 152/381.5, 381.6, 400, 516, 520, 521

(56) References Cited

U.S. PATENT DOCUMENTS

| | | |
|---|---|---|
| 1,766,393 A | 6/1930 | Metts |
| 2,019,120 A | 10/1935 | Cunningham et al. |
| 2,203,774 A | 6/1940 | Cornelissen |
| 2,345,444 A | 7/1944 | Lyon |
| 2,670,994 A | 3/1954 | Parrott |
| 2,990,869 A * | 7/1961 | Riley |
| 3,208,798 A | 9/1965 | Peters |
| 4,641,670 A * | 2/1987 | Poque et al. .................. 152/158 |
| 4,794,970 A * | 1/1989 | Huinink et al. .............. 152/158 |
| 5,000,518 A | 3/1991 | Markow |
| 5,772,805 A * | 6/1998 | Bobst ........................... 152/158 |
| 6,186,206 B1 * | 2/2001 | Yamagiwa et al. ......... 152/520 |

FOREIGN PATENT DOCUMENTS

| | | |
|---|---|---|
| EP | 0 490 585 A1 | 6/1992 |
| EP | 0 569 710 A1 | 11/1993 |
| FR | 1.408.477 | 7/1965 |
| GB | 960323 | 6/1964 |
| GB | 967397 | 8/1964 |
| WO | WO 93/23258 | 4/1993 |

\* cited by examiner

*Primary Examiner*—Russell D. Stormer
(74) *Attorney, Agent, or Firm*—Emrich & Dithmar

(57) ABSTRACT

The present invention relates to a rim member having an internal support member associated with the rim member. The internal support member includes an outer peripheral surface having an annular groove with the groove having a transverse passageway to permit a tire to be mounted onto the rim member. The transverse passageway consists of two angular positions which communicate through an intermediate section on the internal support member. The invention also relates to a tire construction having an internal rolling surface which engages the outer peripheral surface of the internal support member during the run-flat condition.

21 Claims, 5 Drawing Sheets

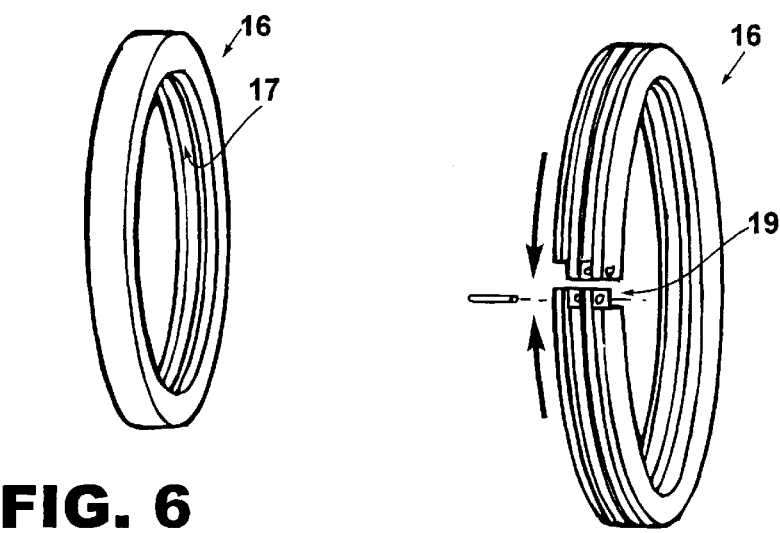
FIG. 6
FIG. 7
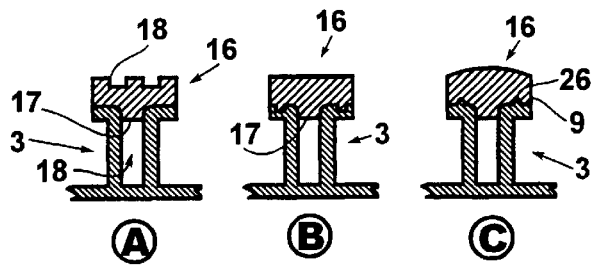
FIG. 8
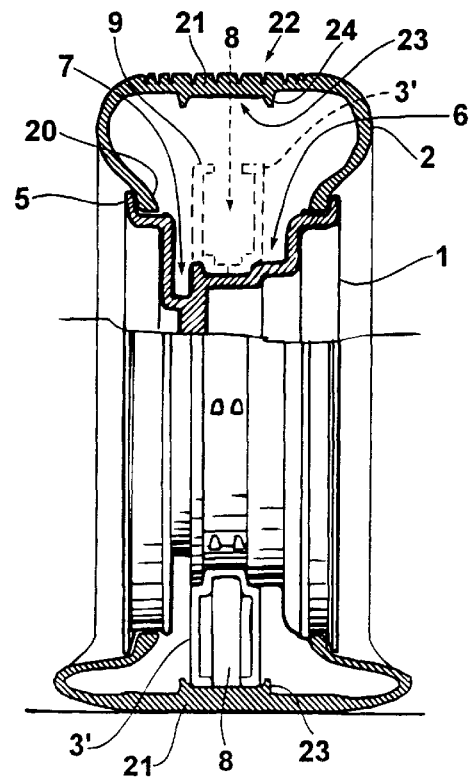
FIG. 9

RIM WITH EMERGENCY GROOVED INTERNAL SUPPORT AND TIRE FOR SAID RIM

BACKGROUND OF THE INVENTION

The present invention relates to rims for land vehicles and, in particular, it relates to a tire rim having an emergency grooved internal annular support member which, when the tire is deflated, permits the vehicle to keep running with the annular support member supporting the deflated tire. The present invention relates also to a special tire construction whose interior surface is structurally arranged and adapted to engage the annular support member and be supported thereby.

DESCRIPTION OF THE PRIOR ART

Several prior art devices or structures are known that enable a vehicle such as a car, pick-up truck, motorbike, moped, or other wheeled vehicle to continue running when one tire or more is deflated and to permit the vehicle to proceed to a suitable location to replace the deflated tire.

However, many of these prior art devices are either very complex in construction, expensive to manufacture, or they affect the conformation or external aspect of the tire rim in such a way that requires that the device include parts which project from the rim, making a generally unaesthetic rim device. Accordingly, such devices have found limited commercial acceptance.

For example, GB Patent 960323, GB Patent 967397 and FR Patent 1408477 disclose devices for spare rims which are mechanically complicated and expensive to manufacture and maintain. Other devices, such as the rim devices disclosed in U.S. Pat. Nos. 2,019,120 and 3,208,798 disclose rim devices which include one or two externally mounted side support steel ring members attached to the rim, such that upon tire deflation, the supporting rings engage the ground surface to provide support for the wheeled vehicle.

Other tire support devices are found in U.S. Pat. No. 5,000,518 which relates to an annular ring attached to the rim and having an elastomer mounted to the end thereof, U.S. Pat. No. 1,766,393 which has an annular ring with a wedging groove having an annular elastomer thereon attached to the rim, and U.S. Pat. Nos. 2,203,774, 2,354,444 and 2,670,994 all which have grooved peripheral annular devices attached to the rim that retain the elastomer to the extended end of the annular device to engage the road surface during the run-flat condition. Argentinean Patent Application No. P010101027 also refers to a spare rim to be permanently used next to the main rim.

Japanese Patent PCT/JP93/00600 discloses a rim with internal central emergency support, in which the central support has interrupted or reduced peripheral continuity. Therefore, in case of the run-flat condition, the support contact against the internal tire band is discontinuous, a condition that will rapidly destroy the deflated tire during the run-flat condition.

Finally, EP Patent 0569710 and EP Patent 0490585 disclose two internal supports which are detachable and very complex because they consist of many parts. Furthermore, these internal supports lack a system with an entrance and exit passage to the groove for the tire. Another limitation of these devices is that the supports may only be mounted sideways with respect to the main rim.

SUMMARY OF THE INVENTION

One object of the present invention is an internal support run-flat member, preferably integrally mounted to the rim member, and having an annular groove therearound and a transverse passage divided into entrance and exit sections of the groove which permits mounting of a tire onto the rim member.

A further object of the present invention is an annular grooved internal support run flat member which provides reduced contact between the grooved run-flat member and the internal surface of the tire body thereby reducing the friction between the internal support member and the tire during the run-flat condition.

In the present invention, the annular grooved internal support member, having a transverse passage therethrough, includes an extended annular support contact surface where the divided transverse passage is positioned in the support member. Thus, when a vehicle runs with a deflated tire, the vehicle's weight is more evenly distributed on the support member, thereby reducing wear of the rim and damage to the deflated tire. The annular groove may also serve as a mounting for an elastomer member to cushion the engagement between the support member and the inside surface of the deflated tire. Therefore, compared to a solid support, the weight of the tire rim is reduced without affecting the structural strength of the internal support member.

Additionally, the internal support member includes an annular groove therein having a transverse passage extending thereacross and divided into entrance and exit sections, thus maintaining and providing the continuity of the peripheral bearing surface for the internal support member. Therefore, in any rotational position of the rim, the support member provides a bearing surface for the deflated tire. This eliminates the necessity of placing padding or cushioning in transverse passages.

When the advantages of the present invention are combined with and added to the fact that the internal support member, when the wheel is assembled on the rim member, is positioned inside the mounted tire. Thus, the rim is not bulkier than conventional rim structures and has no parts which project outwardly from the rim. Because the support is positioned inside the tire, the external aspect of the tire mounted on the rim is not aesthetically affected.

Moreover, the rim member in accordance with the present invention does not require a complex mechanism which involves expensive manufacturing, maintenance, or repair costs, and the special tire construction of the present invention is complementary with the rim member and its internal support member, thereby preventing fractures or lateral shifts of the tire with respect to the rim during the run-flat condition. Finally, the increased thickness provided by the tread portion of the tire cushions running when a tire is deflated.

The present invention consists of certain novel features and structural details hereinafter fully described, illustrated in the accompanying drawings, and particularly pointed out in the appended claims, it being understood that various changes in the details may be made without departing from the spirit or sacrifice any of the advantages of the present invention.

DESCRIPTION OF THE DRAWINGS

For the purpose of facilitating an understanding of the present invention, there is illustrated in the accompanying drawings a preferred embodiment of the present invention, from an inspection of which, when considered in connection with the following description, the invention, its construction and operation and many of its advantages may be readily understood and appreciated.

FIG. 6 is a perspective view of an elastomer member in accordance with a further embodiment of the present invention;

FIG. 7 is a perspective view of an elastomer member illustrating a coupling for the elastomer in accordance with a further embodiment of the present invention;

FIGS. 8A–C are cross-sectional views of internal support members mounted to an elastomer member in accordance with several embodiments of the present invention;

FIG. 9 is a cross-sectional view of the present invention illustrating a detachable internal support member mounted to the rim member in accordance with one embodiment of the present invention;

REFERENCE NUMERALS IN THE DRAWINGS

1. Rim member;
2. Tire;
3. Internal support member;
3'. Segmented internal support member;
4. Main body portion of rim member;
5. Side frames or shoulders;
6. Annular throat;
7. Annular throat;
8. Annular groove;
8'. Intermediate section of said annular groove;
9. Peripheral surface contact (auxiliary bearing periphery);
10. Transverse passageway;
11. Entrance section;
12. Exit section;
13. Wedging guides;
14. Borders for wedging;
15. Structural reinforcements;
16. Elastomer member;
17. Annular bead;
18. Gap in the auxiliary bearing periphery;
19. Coupling in the bearing elastomer member;
20. Tire bead and sidewall;
21. Tread bearing support band;
22. External rolling band;
23. Internal rolling surface;
24. Annular projection rings;
25. Double annular projection rings;
26. Fluting;
27. Internal edge of rim 2 adjacent to side frames 5 for beads 20; and
28. Shoulder portions.

DETAILED DESCRIPTION OF THE DRAWINGS

Figure 1:
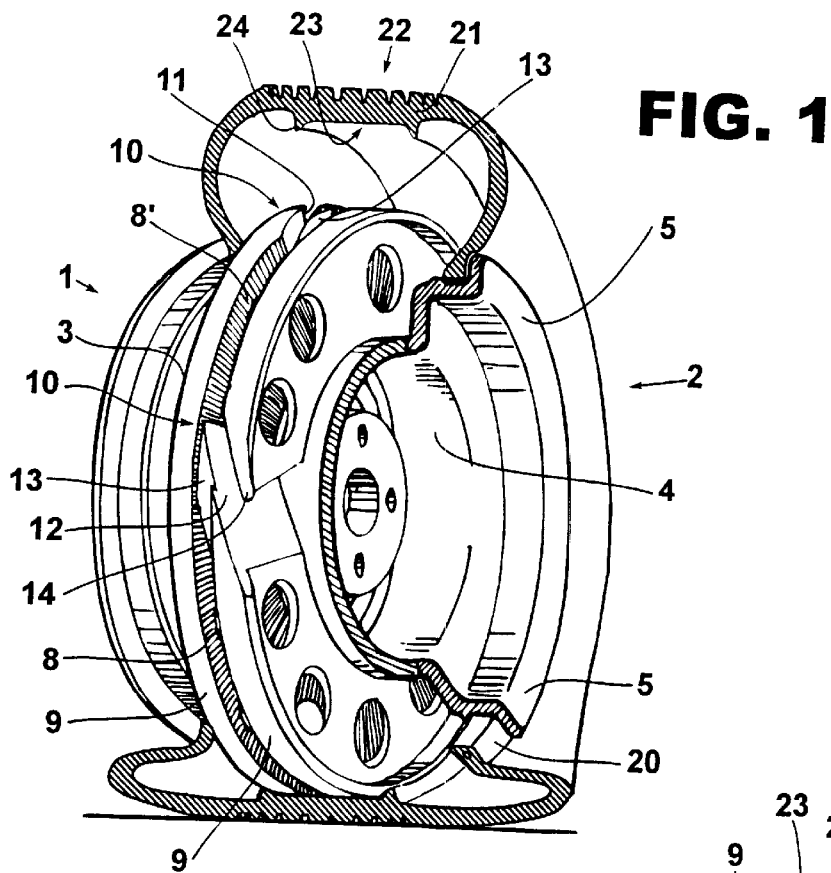
FIG. 1 is a perspective view of a deflated tire in cross-section mounted to the rim and internal support member in accordance with one embodiment of the present invention.
Figure 2:
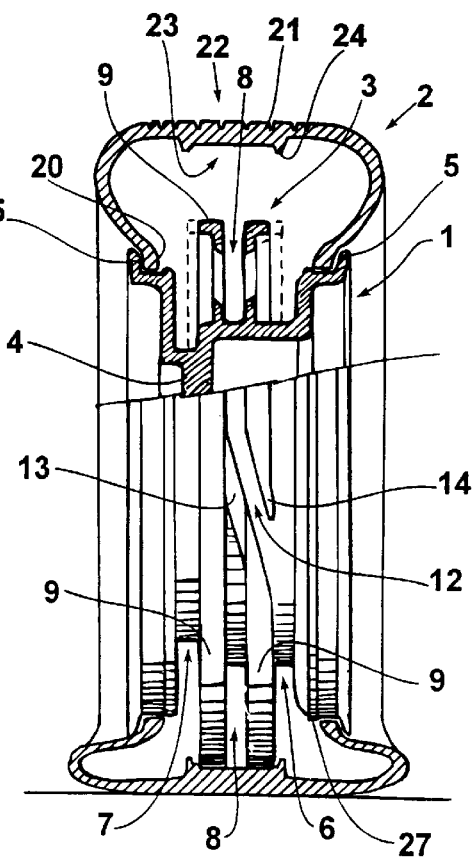
FIG. 2 is a cross-sectional view of the deflated tire of FIG. 1.
Figure 3:
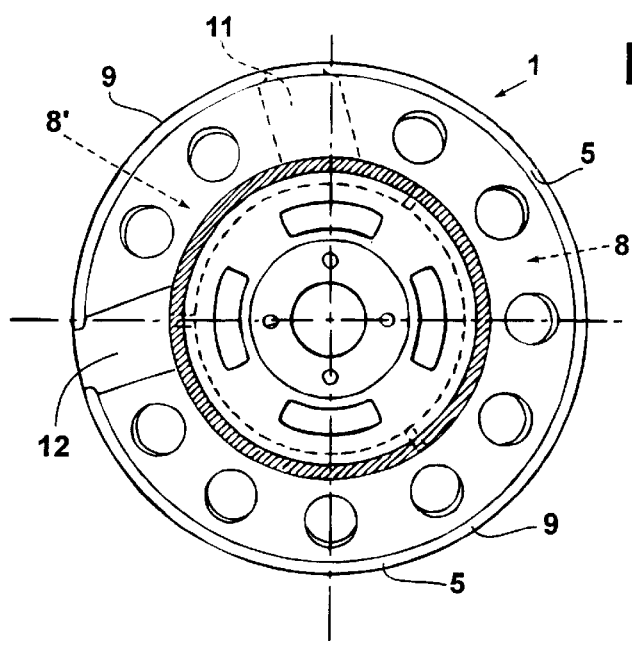
FIG. 3 is a side view of the internal support member in accordance with one embodiment of the present invention.
Figure 4:
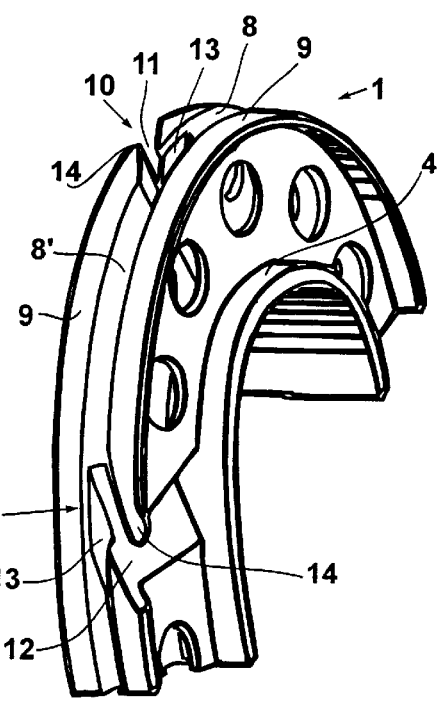
FIG. 4 is a partial perspective view of the internal support member in accordance with one embodiment of the present invention.

In the various drawings, the same reference numerals have been used to indicate the same or similar parts. The present invention includes a rim member 1 and an emergency grooved internal support member 3, with the internal support member having an annular groove 8 therein. In FIGS. 1–2 and 4, the annular groove 8 of the internal support member 3 includes a transverse passageway 10 therein which permits the wedging of the tire beads and sidewall 20 (FIG. 5C) of a tire onto the rim member 1 to mount the tire to the rim members. The passageway 10 is made up of two sections 11 and 12 which enter the annular groove 8 at different angular positions with respect to the rim 1. The sections 11 and 12 of passageway 10 communicate through an intermediate section 8' (FIG. 3) of the annular groove 8 while maintaining an outer peripheral contact surface 9 (FIG. 4) of the internal support member 3 with the inside surface 23 of the tire 2 (FIGS. 1–2 and 5A–B).

More particularly, the present invention relates to a rim member 1 whose main or central portion is structurally modified to serve as an emergency bearing support on which the support member and tread portion 21 of the tire 2 cooperate when the tire 2 is deflated. The main body portion 4 of the rim member 1 has a central opening for the mounting to the axis end of the vehicle to which it will be attached. To both ends of the rim member 1, the main body 4 includes two side frames or shoulders 5 which act as the bead retention means for the tire beads 20 and sidewall of the tire 2.

In the central or intermediate portion of the rim member 1, the main body portion 4 supports a substantially annular internal support member 3 having an outer peripheral diameter greater than the outer peripheral diameter of the side frame or shoulders 5. The internal support member 3, which is preferably integral to the rim member 1, includes an annular groove 8 and, in the embodiment shown in FIGS. 1–4, has an U-shaped cross-section, with two wings projecting laterally from its free ends which provide the auxiliary bearing periphery surface 9, as will hereinafter be described. To both sides of the internal support 3, between the support and the, side frames 5, there is a pair of annular throats 6 and 7, each having an outer diameter less that the outer diameter of the main body portion 4 and the outer diameter of the side frames or shoulders 5.

Figure 10:
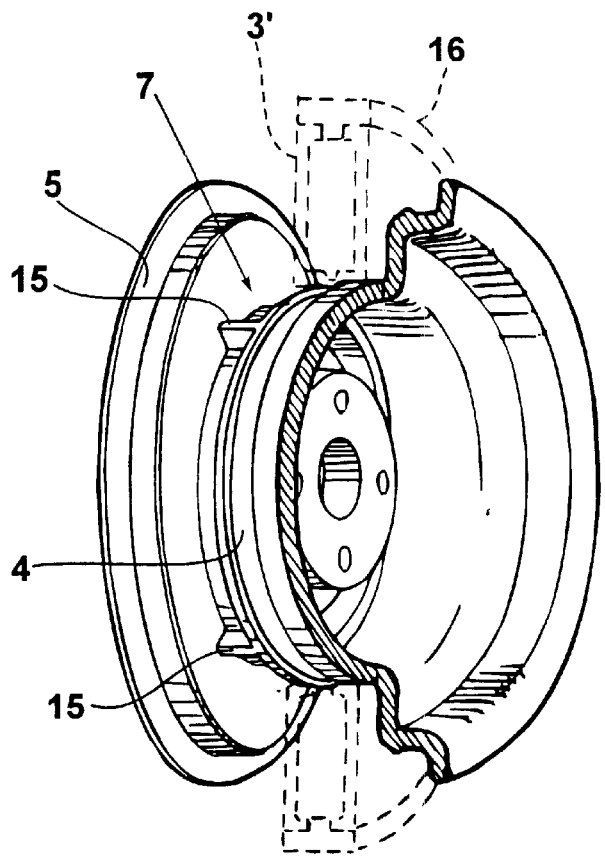
FIG. 10 is a perspective view of the rim member illustrating in phantom the detachable internal support member in accordance with another embodiment of the present invention.
Figure 11:
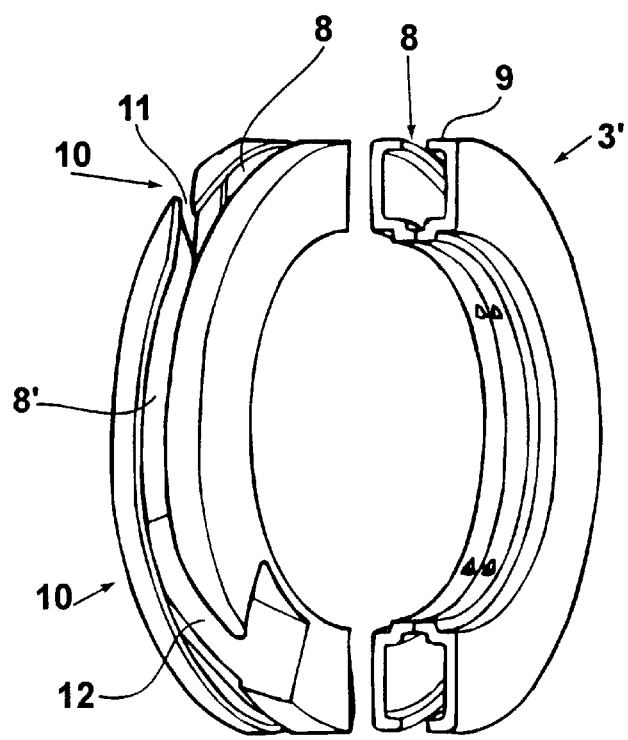
FIG. 11 is a perspective view of the detachable internal support member of FIG. 10.
Figure 12:
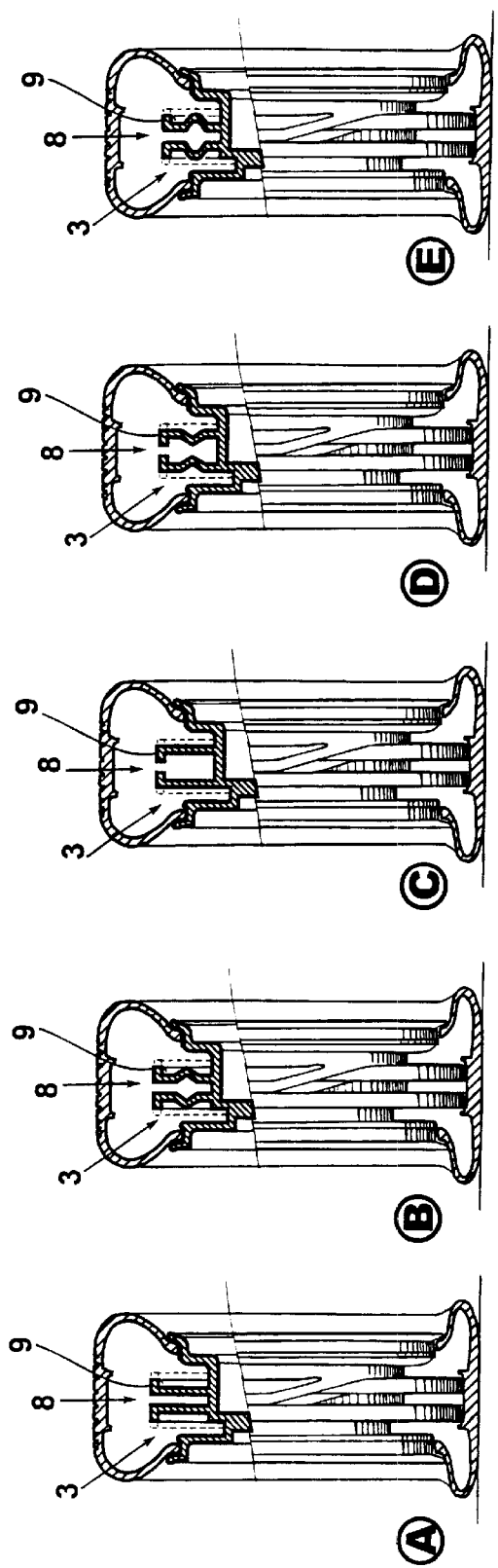
FIGS. 12A–E are cross-sectional views showing various configurations of the detachable internal support member mounted to a rim member in accordance with the present invention.

In one embodiment of the present invention, one of the annular throats 6 or 7 has an outer diameter deeper than the other annular throat. In the embodiment of FIGS. 1–2 and 4, the deeper annular throat 7 has such a range that the distance between any point at its bottom and any point totally opposed at the bottom of the transverse passage 10 is less than the diameter of the wedging mouth of the tire 2. To compensate for this greater depth, structural reinforcements 15 are included in the support member (FIG. 10).

The above mentioned annular throats 6 and 7 communicate with each other through a transverse wedging passageway 10 which obliquely passes through the internal support member 3. This transverse passageway 10 is divided into an entrance section 11 and an exit section 12 (FIGS. 3–4) through which the beaded tire sidewall 20 is positioned when the tire 2 is mounted onto the rim member 1. Because both sections 11 and 12 are in different angular positions on the body 4 of the rim 1, they communicate with each other through an intermediate section 8' of the annular groove 8. Therefore, the complete interruption of the peripheral contact surface or the auxiliary bearing periphery 9 of the internal support 3 is avoided.

In this embodiment of the present invention, the entrance of entrance section 11, the exit of exit section 12, the external ends of the transverse passageway 10, project forming respective borders 14 (FIGS. 1 and 2) which permit wedging of the tire 2 about the support member 3. Furthermore, where the intermediate section 8' of the annular groove 8 and the entrance section 11 and exit sections 12 meet, there are two wedging guides 13 which facilitate directing the beaded sidewall 20 through the transverse passageway 10.

In order to maintain the rim member 1 balanced, it has been taken into account that in a position totally opposed to the position of the transverse passageway 10, the internal support member 3 should have counterbalanced cavities of a range equivalent to one of the transverse passageway 10. In a preferred embodiment, these counterbalanced cavities do not interrupt the auxiliary bearing periphery surface 9 which remains continuous.

The auxiliary bearing periphery surface 9, which faces the tread bearing support band 21 of the tire 2, may having a bearing elastomer 16 mounted thereon, which acts as an intermediary or cushion between the internal support 3 and internal rolling surface 23 of the tread bearing support band 21 of the tire 2. For these means to work easily, it has been taken into account that the bearing elastomer 16 should be able to slide or slip, not only with respect to the internal support member 3, but also with respect to the internal rolling surface 23 of the tire 2.

In a further embodiment of the present invention is shown in FIGS. 8A–B a bearing elastomer member 16 provided with an annular bead 17 to be wedged into the gap 18 of the annular groove 8 of the internal support member 3. The link between the bearing elastomer member 16 and the internal support member 3 may also include auxiliary side grooves for the support member 3 and auxiliary beads for the former 16 which may form a fluting 26 (FIG. 8C). The bearing elastomer member 16 may be an annular part member (FIG. 6) or it may have a coupling 19 which enables to open (FIG. 7) in order to mount and dismount the same onto the member 3. The coupling 19 comprises reciprocal fitting ends, a key and a passage for the key (FIG. 7).

Figure 13:
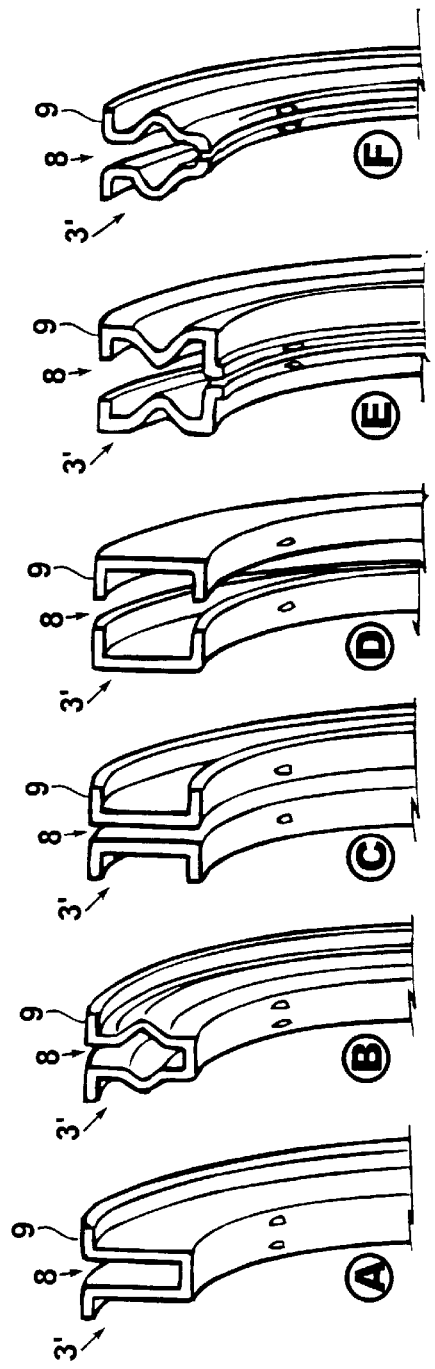
FIGS. 13A–F are partial perspective views of detachable internal support member configurations in accordance with the present invention.

In a preferred embodiment of the invention, the rim 1 is a one-piece member and the internal support 3 is formed integral therewith. However, it is also within the scope of the present invention that instead of being formed integrally with the rim member 1, the internal support member may be detachable and unremovably mounted to the main body portion 4 of the rim member 1. In this embodiment, the internal support member 3' (FIG. 9) comprises two complementary shaped parts or portions whose separation defines an annular groove 8. As shown in FIGS. 13A–F, the support member 3' may comprise two sets of semi-annular complementary shaped parts (FIGS. 13A–B) forming the internal support 3' which may be C-shaped, adjacently facing each other on their open side (FIG. 13D) or, on the contrary, on their closed side (FIG. 6). They may also have strengthening ribs (FIGS. 13B, E and F).

Figure 5:
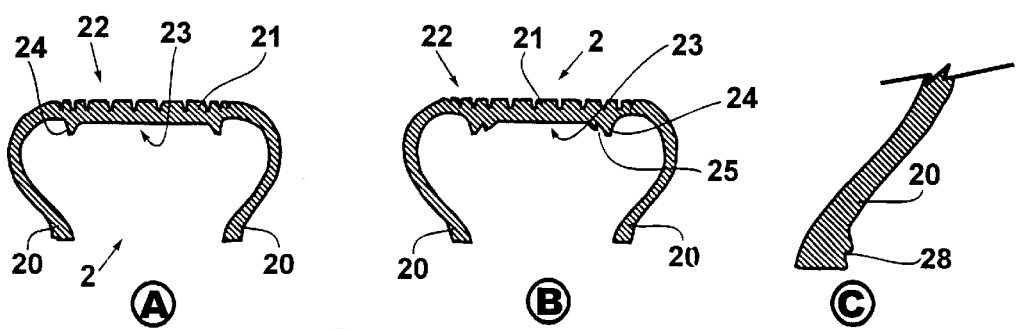
FIG. 5A is a cross-sectional view of a tire construction in accordance with one embodiment of the present invention.
FIG. 5B is a cross-sectional view of a tire construction in accordance with a further embodiment of the present invention.
FIG. 5C is an enlarged cross-sectional view of the sidewall of the tire in accordance with one embodiment of the present invention.

As shown in FIG. 5, the tire 2 is an annular tire formed by a support band or tread portion 21 with both flanks or sidewall portions 20 extending from its longitudinal borders and ended in two beads 20. The tread portion 21 forms an internal rolling surface 23 structurally arranged to cooperate with face 9 of the internal support member 3 of the rim 1. This rolling surface 23 faces the auxiliary bearing periphery 9 of the substantially annular support member 3.

In the present invention, it has been taken into account that the support band or tread portion 21, preferably, should include some annular projection rings 24 thereon to avoid relative side shift between the internal support member 3 and the internal rolling surface 23 of the tire 2, as shown in FIGS. 5A–B. Even though the rolling surface 23 should avoid side shifts, it may be made of materials which make it slide easily with respect to the internal support member 3 bearing periphery 17 or with the bearing elastomer 16.

Finally, in a preferred embodiment, the beads and sidewall 20 may have ledges or shoulders thereon 28 which facilitate the anchoring of the bead and side walls against the side frames or shoulders 5 of the rim member 1. These ledges or shoulder portions 28, which are annular and concentric may be one or more on the sidewall.

When the tire 2 becomes deflated, its contraction stops against the bearing periphery surface 9 of the annular support member 3. Therefore, the wheel keeps rolling, resting on said support 3, while the periphery 9 of the latter rolls against the internal bearing surface 23 of the tire 2. The annular projecting rings 24 and 25 extending inwardly from the tread portion prevent relative side shift between the internal support 3, or the elastomer 16 if it is used, and the internal bearing surface 23.

To position the tire 2 onto the rim 1, its wedging mouth is inserted beyond the side frame, and one bead and sidewall of the tire is fitted in the deepest annular throat 7. Then, the border of the wedging mouth where the bead 20 is situated is made to go through the transverse passage 10. In order to achieve this, the bead goes first through the entrance section 11, then through the intermediate section 8' of the annular groove 9, and finally through the exit section 12, going out to the least deep throat 6, where it stops against the adjacent side frame 5. In this manner, the tire is mounted to the rim member 1.

What is claimed is:

1. A run-flat rim member for supporting a deflated vehicle tire includes:
   an annular main body portion providing a mounting for the vehicle tire;
   two sidewall shoulders formed on opposing sides of said annular main body portion and providing an anchoring means for the tire bead sidewall portion mounted on said sidewall shoulders;
   a substantially annular internal support member located between said sidewall shoulder, with said support member having an outer surface greater than said sidewall shoulder and including an annular groove extending around said support member to provide first and second outer peripheral surfaces;

with said internal support member having at least one annular groove extending therein and having a transverse passageway extending therethrough to permit the wedging of the tire beads onto the rim member;

said wedging transverse passageway includes an entrance section and an exit section; and wherein said entrance and exit sections are in different angular positions with respect to the annular main body and communicate with each other through said annular groove without affecting the continuity of the peripheral surface contact.

2. The fun-flat rim member in accordance with claim 1, wherein between said annular main body portion and said side frames there are two side throats which permit wedging of the sidewall of the tire onto the rim member.

3. The run-flat rim member in accordance with claim 2, wherein said throat located between said main body and said sidewall shoulder is annular.

4. The run-flat rim member in accordance with claim 2, wherein both side throats are annular in cross-section and each possesses a smaller diameter than the main body portion and the sidewall shoulders.

5. The run-flat rim member in accordance with claim 2, wherein the outer diameter of one of said side throats is less than the outer diameter of the other of said side throats and one of said side throats has an outer diameter less than the wedging mouth diameter of the tire.

6. The run-flat rim member in accordance with claim 1, wherein said entrance section of said transverse passageway starts on the outside with respect to the vehicle's mounting axis, while the exit section finishes inside thereof, facing said mounting axis.

7. The run-flat rim member in accordance with claim 1, wherein said internal support member is detachable and removably fixed to said annular main body portion.

8. The run-flat rim member in accordance with claim 7, wherein said internal support member is detachable and removably fixed to the intermediate section of said main annular body and wherein said detachable internal support member includes an annular groove therein.

9. The run-flat rim member in accordance with claim 7, wherein said detachable internal support member is comprised of two complementary shaped parts removably mounted around the intermediate section of said main annular body portion.

10. The run-flat rim member in accordance with claim 7, wherein said detachable internal support member is comprised of two sets of complementary semi-annular shaped parts, removably mounted around the intermediate section of said main annular body portion.

11. The run-flat rim member in accordance with claim 1, wherein said internal support member has a U-shaped cross-section with two wings projecting laterally from its free ends to provide auxiliary bearing peripheral surfaces.

12. The run-flat rim member in accordance with claim 7, wherein the side branches form two folds.

13. The run-flat rim member in accordance with claim 10, wherein each set of shaped parts consists of two C-shaped parts.

14. The run-flat rim member in accordance with claim 13, wherein each set of shaped parts consists of two C-shaped parts adjacently opposing on their open side.

15. The run-flat rim member in accordance with claim 13, wherein each set of shaped parts consists of two C-shaped parts adjacently opposing one another on their closed side.

16. The run-flat rim member in accordance with claim 1, wherein said first and second outer peripheral surfaces of the said internal support member include an elastomer member mounted thereon.

17. The run-flat rim member in accordance with claim 1, wherein said internal support member includes auxiliary side grooves thereon structurally arranged to receive and mount said elastomer member.

18. The run-flat rim member in accordance with claim 16, wherein said elastomer member is comprised of a smooth material.

19. The run-flat rim member in accordance with claim 1, further including a tire having a tread bearing support band for cooperating with said internal support member.

20. The run-flat rim member in accordance with claim 19, wherein said rolling surface of said tread bearing support band includes annular projecting rings extending inwardly to maintain said tire in engagement with said internal support member.

21. The run-flat rim member in accordance with claim 20, wherein said annular projecting rings are comprised of sets of annular projection rings to maintain said deflated tire in engagement with said internal support member.

* * * * *